United States Patent [19]

Citta et al.

[11] Patent Number: 4,817,144

[45] Date of Patent: Mar. 28, 1989

[54] SECURE TV SCRAMBLING SYSTEM USING FRAMING CODE SWITCHING

[75] Inventors: Richard W. Citta, Oak Park; Paul M. Gosc, Buffalo Grove; Dennis Mutzabaugh; Gary J. Sgrignoli, both of Mount Prospect, all of Ill.

[73] Assignee: Zenith Electronics Corporation, Glenview, Ill.

[21] Appl. No.: 25,235

[22] Filed: Mar. 12, 1987

[51] Int. Cl.⁴ .............................................. H04K 1/02
[52] U.S. Cl. ...................................... 380/20; 380/17; 380/21; 380/43
[58] Field of Search ..................... 380/10, 21, 20, 43, 380/17

[56] References Cited

U.S. PATENT DOCUMENTS

| | | | |
|---|---|---|---|
| 3,919,462 | 11/1975 | Hartung et al. | 380/17 |
| 4,322,745 | 3/1982 | Saeki et al. | 380/10 |
| 4,484,025 | 11/1984 | Ostermann et al. | 380/28 |
| 4,531,020 | 7/1985 | Wechselberger et al. | 380/43 |
| 4,590,519 | 5/1986 | Zelenz | 380/20 |
| 4,716,588 | 12/1987 | Thompson et al. | 380/20 |
| 4,723,283 | 2/1988 | Nagasawa et al. | 380/20 |

*Primary Examiner*—Salvatore Cangialosi

[57] ABSTRACT

A television signal scrambling system scrambles by suppressing horizontal syncs and changing the phase of the video carrier during the horizontal intervals. Data is transmitted by using two different widths for the horizontal intervals. Framing code information is sent by means of long pulses of two different durations during the vertical blanking interval. Three filters are utilized for dynamic scrambling, with filters A and B defining one scrambling mode and A and C defining a second scrambling mode. Corresponding descrambling filters are included in subscriber terminals and the subscriber microprocessor controllers have information downloaded as to the filter pairs to be used for descrambling based upon the receipt of the first or second framing code and a mode definition. The mode definitions are in the form of encrypted data and are dynamically changed by downloading to the subscriber terminals.

13 Claims, 2 Drawing Sheets

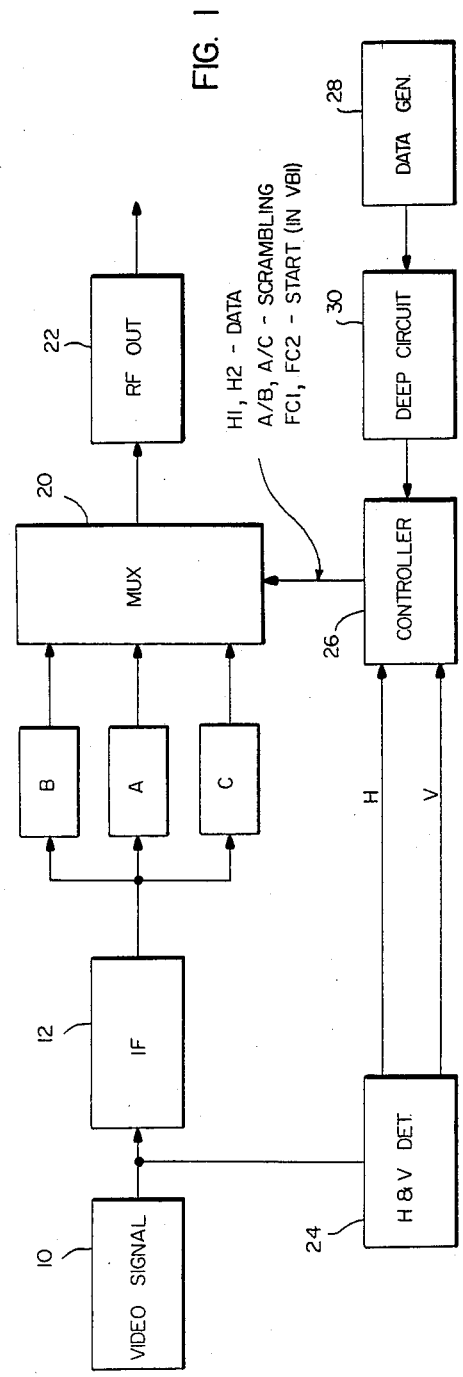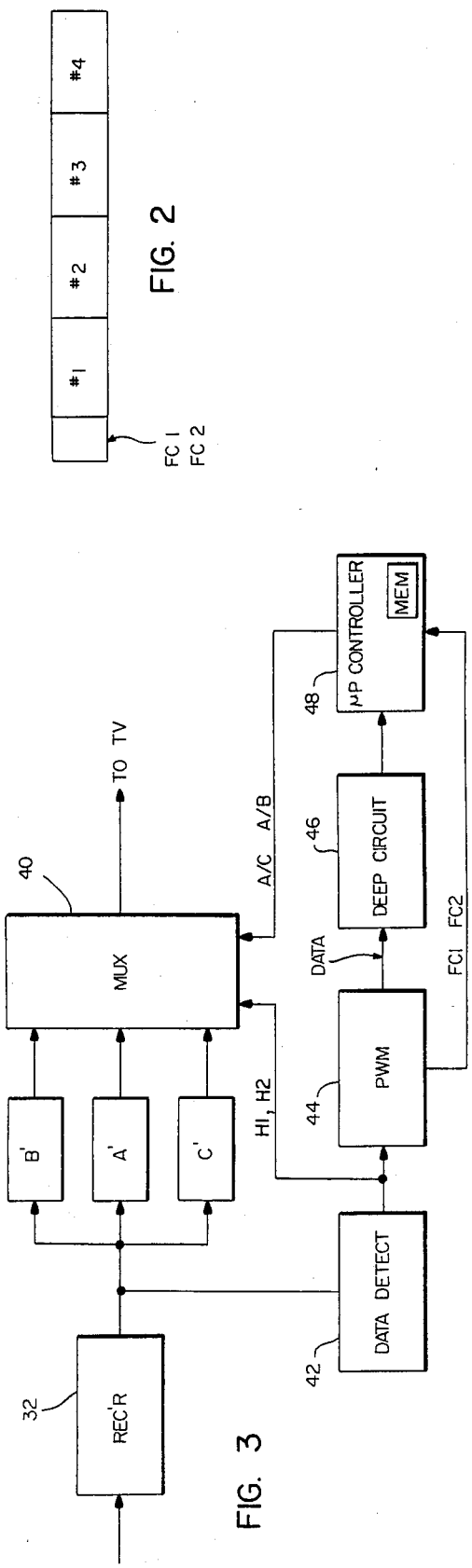

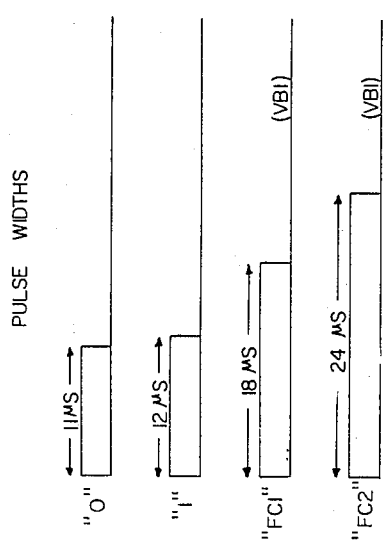

SECURE TV SCRAMBLING SYSTEM USING FRAMING CODE SWITCHING

CROSS REFERENCE TO RELATED PATENTS AND APPLICATIONS

This application is related to apparatus disclosed and claimed in U.S. Pat. No. 4,467,353 issued Aug. 21, 1984 entitled TELEVISION SIGNAL SCRAMBLING SYSTEM AND METHOD in the names of R. Citta and R. Lee, U.S. application Ser. No. 711,947, filed 3/15/85 entitled TELEVISION SIGNAL SCRAMBLING METHOD in the names of R. Citta, D. Mutzabaugh and G. Sgrignoli, application Ser. No. 712,949 filed 3/15/85 entitled TELEVISION SIGNAL DATA TRANSMISSION SYSTEM in the names of R. Citta, D. Mutzabaugh and G. Sgrignoli, and U.S. application Ser. No. 025,236 filed 3/12/87 entitled SECURE DATA PACKET TRANSMISSION SYSTEM AND METHOD in the names R. Citta, P. Gosc, D. Mutzabaugh and G. Sgrignoli, now U.S. Pat. No. 4,771,458, issued 9/13/88 and application Ser. No. 025,240 filed 3/12/87 entitled COMBINED FPLL CIRCUIT FOR DATA PACKET TRANSMISSION SYSTEM in the names R. Citta and G. Sgrignoli, all of which are assigned to Zenith Electronics Corporation and all of which are hereby incorporated by reference.

BACKGROUND OF THE INVENTION AND PRIOR ART

This invention relates in general to television signal transmission systems and specifically to a means and method for making television signal transmission systems more secure.

The above-mentioned '353 patent describes and claims a phase modulated television signal scrambling system in which information in the horizontal blanking intervals is suppressed in amplitude and the video carrier is subjected to a phase reversal. Copending application Ser. No. 712,949 describes and claims apparatus for transmitting data by modulation of the width of the horizontal blanking intervals. Application Ser. No. 025,236, discloses and claims a system for simultaneously encrypting and error protecting the data. In application Ser. No. 025,240 a novel frequency and phase locked loop is described for readily recovering the data in a phase modulated transmission system such as that disclosed in Ser. No. 712,949. The present invention is specifically directed to a means and method for utilizing a start signal (herein referred to as a framing code) for not only initiating the data detection system in the subscriber terminal but, in conjunction with a mode definition that is transmitted in encrypted form, for determining the descrambling mode to be used for descrambling the scrambled television signal.

In subscription television systems, signals are transmitted, either "over the air" or over a suitable cable network, in a scrambled form which renders the broadcast video information substantially unviewable when received by conventional television receivers. To permit viewing, each subscriber terminal is equipped with a decoder for descrambling the scrambled signals. Security is of major importance in designing a scrambling system to prevent unauthorized use of the broadcast information by non-paying subscribers. This need must, however, be tempered by economics and the need to be capable of reliably decoding the scrambling signals by authorized system subscribers.

It is well-known that the cable head-end or broadcasting station has the capability of individually communicating with subscriber terminals and downloading authorization information into suitable memories located thereat. The authorization information determines the types of programs the subscriber terminal is authorized to descramble. While elaborate scrambling techniques can readily frustrate potential "pirates," the descrambling means employed should be simple and economical to permit acceptance by cable system operators.

The phase modulation system described in the '353 patent provides a scrambled television signal. Use of the techniques described in the various copending applications significantly enhances the system security by additionally providing encrypted data that must be decrypted to permit proper operation of the descrambling apparatus at the subscriber terminal. The present invention adds still further protection to the scrambling system by incorporating different scrambling modes and providing a combination of a relatively noise-immune, but somewhat non-secure, start signal or framing code and relatively secure, but somewhat noise sensitive, encrypted data that determines which descrambling mode is to be used at any particular time. In the data packet communication system employed in the invention, the scrambling mode definitions are generally changed at random and communicated to individual subscriber terminals as encrypted data. Framing code signals are sent to permit rapid switching between the descrambling modes defined by the previously communicated encrypted data. As will be seen, this further enhanced security is obtained at substantially no added cost to the system.

OBJECTS OF THE INVENTION

A principal object of the invention is to provide a novel television signal scrambling system and method.

Another object of the invention is to provide a scrambling television system and method of improved security.

A further object of the invention is to provide a television signal scrambling system that is dynamically changeable among scrambling modes.

BRIEF DESCRIPTION OF THE DRAWINGS

These and other objects and advantages of the invention will be apparent upon reading the following description in conjunction with the drawings in which:

FIG. 1 represents a partial block diagram of a cable head-end or transmitter constructed in accordance with the invention;

FIG. 2 diagrammatically represents the data packet arrangement used in the system of the invention;

FIG. 3 represents a partial block diagram of a subscriber terminal constructed in accordance with the invention;

FIG. 4 is a chart showing how the data and framing codes are determined by pulse widths;

FIG. 5 is a chart showing framing codes and descrambling modes; and

FIG. 6 is a table illustrating the sequence of mode definition changes used in the invention.

DESCRIPTION OF THE PREFERRED EMBODIMENT

Referring to FIG. 1, a source of composite video signal 10 is coupled to an IF amplifier means 12 and therefrom to a plurality of filters A, B and C of differing characteristics. The filters are all coupled to a multiplexing circuit (MUX) 20 where they are selectively connected to the common output terminal of MUX 20 and applied to an RF output stage 22. It will be appreciated that the combination of filters A, B and C and MUX 20 comprises a channel encoder for scrambling the composite video signal from source 10. The video signal is also applied to a detector circuit 24 where the horizontal and vertical sync signals in the composite video signal from source 10 are determined and applied to a controller 26 that is preferably microprocessor based. A data generator 28 is coupled to a data encryptor and error protection means (DEEP) 30 which is constructed in accordance with the invention in co-pending application Ser. No. 025,236 and applied to controller 26. The output of controller 26 controls operation of MUX 20. As indicated, the information supplied from controller 26 to MUX 20 includes binary data in the form of H1 and H2 (the durations of the horizontal blanking interval in the television signal). The binary data, which is occasioned by a phase shift in the television carrier, includes, inter alia, encrypted global data A/B or A/C representing scrambling mode definition information defining the pair of the filter circuits A,B,C that are alternately switched during each scrambling mode. FC1 and FC2 framing code or start signals are sent in the vertical blanking interval of the television signal to all subscriber terminals.

In response to the information from controller 26, MUX 20 is switched to selectively couple the video signal from IF amplifier 12 through filter A and one of the filters B and C. In practice, filter A may comprise a direct path in which no phase or amplitude change is imparted to the video signal, whereas filters B and C may comprise paths where the amplitude of the video signal during horizontal blanking intervals is suppressed and the phase of the video carrier (during those blanking intervals) is altered by different amounts. In a preferred embodiment, one of the filters comprises means for imparting a substantially 180° phase reversal and a first predetermined attenuation to the video carrier during the horizontal blanking interval whereas the other filter imparts an opposite polarity phase reversal and a second predetermined attenuation to the video signal. MUX 20 therefore selectively couples either filters A and B to the RF output 22 or filters A and C to RF output 22 thus establishing two different scrambling modes as taught in copending application Ser. No. 711,947.

As previously mentioned, and as taught in copending application Ser. No. 712,949, the duration of each horizontal blanking interval of the scrambled television signal is defined as either H1 or H2 to convey binary data to the subscriber terminals. This data is in the form of four packets of 64 bits each. Reference to FIG. 2 indicates the arrangement of the binary data in the system of the invention. As indicated, four data packets of binary information are shown. A start code or signal listed as FC1 or FC2 is also shown. The start code, as will be described, consists of a relatively long pulse in the vertical blanking interval whose phase is reversed by substantially 180 degrees and is referred to as a framing code. The framing code serves as a start signal for the four following packets of data. The data packet #1 is a "global" packet that is received by all subscriber terminals and includes the program tags for the television signals or channels and conveys other information of general interest such as descrambling mode definitions as will be explained below. The global data packet is followed in succession by three individually addressed data packets that are receivable only by the specifically addressed subscriber terminal. The addressed data packets generally include authorization data defining the level of programming the subscriber terminal is authorized to receive and various decryption keys to enable decoding of the data, as will be explained below. The various decryption keys and data are stored in subscriber terminal memories along with the authorization data.

Referring to FIG. 3, each subscriber terminal includes a receiver 32 for receiving the transmitted scrambled television signals from the cable head-end. Receiver 32 also supplies a data detector 42 and a plurality of complementary filters A', B' and C' having outputs that are coupled to a MUX 40, the common output terminal of which is connected to a conventional television receiver (not shown). Data detector 42 may be any type of detector capable of detecting the phase modulation characterizing the framing code and horizontal intervals H1 and H2 in the scrambled signal. Preferably, the data detector includes an FPLL circuit constructed in accordance with the teachings of copending application Ser. No. 02,240 (D5243). The output of data detector 42 includes pulses defined by the carrier phase reversals or changes in the scrambled signal. The pulses representing horizontal blanking intervals H1 and H2 are provided to MUX 40 over a suitable connection and essentially "tells" MUX 40 when the A' filter and the B' or C' filters are to be switched. The output of data detector 42 is also supplied to a PWM circuit 44 which formulates corresponding logic signals. PWM 44 has two outputs, one for data indicating a binary 0 or a binary 1, and another indicating framing code FC1 or framing code FC2.

Reference to FIG. 4, where the pulses and their durations are indicated may be helpful at this time. In accordance with the invention, an 11 microsecond horizontal interval represents a binary 0 and a 12 microsecond horizontal interval represents a binary 1. During the vertical blanking interval, an 18 microsecond pulse represents framing code FC1 and a 24 microsecond pulse represents framing code FC2. The data output, that is the binary information of PWM 44, is supplied to a DEEP decryption circuit 46 where, as fully disclosed in copending application Ser. No. 025,236, the data is decrypted and supplied to a microprocessor controller 48 along with the framing code from PWM 44. Microprocessor controller 48 preferably includes memory means for storing descrambling mode definition information received in the encrypted data which determines which of the two filter combinations A' and B' or A' and C' will be alternately switched by MUX 40. Obviously, the proper filters must be switched in synchronism with the encoding filters to provide a descrambled output signal for the television receiver. Reference to FIG. 5 illustrates the technique for determining descrambling modes based upon the received framing code and the descrambling mode definitions.

As graphically represented in FIG. 5, the descrambling mode definitions are stored in the microprocessor memory. The memory is updated every field (by a correct global packet) to store mode definitions received as encrypted data from the transmitting station. For example, at any given time, a mode definition state, e.g. state 01, may be stored in the memory. FIG. 5 illustrates the three other possible combinations of mode definition states defined as 10, 11 and 00.

In response to the receipt of a framing code the decoder assumes a descrambling mode defined by the stored mode definition state and FC1 or FC2. Thus, if the stored mode definition state is 01, the receipt of framing code FC1 causes the decoder to assume descrambling mode A'/B' and the receipt of framing code FC2 causes it to assume mode A'/C', and so on.

The point is that the scrambling mode definition, i.e., which descrambling mode the framing code signal represents, is put into the microprocessor memory means 48 of the individual subscriber terminals, along with information about decryption keys and the like. With this information in memory, it is only necessary to change framing codes to effect a change in scrambling and descrambling modes, and may be done on a pseudo-random basis. As will be apparent to those skilled in the art, the framing code signal, that is whether FC1 or FC2 is being sent, could be readily available to a pirate who "breaks into" a subscriber terminal decoder, detects the pulses by phase changes in the VBI and provides some form of pulse width modulation detection. Yet the framing code signal is relatively immune to noise and is therefore considered a "rugged signal". The mode definition, on the other hand, is encryptd data, which while being more subject to noise, gives a greater measure of security.

The invention combines the benefits of each by assuring that mode switching only occurs in response to a framing code signal change to assure that all subscriber terminals receive the mode switching signal. In practice the mode definitions are sent to all subscriber terminals as encrypted data in the global packet. To assure that all subscriber terminals receive the mode definitions, the definitions are sent for a minimum number of times before a framing code change is permitted. Since a single error in the global packet will cause its rejection, a minimum number of transmission of the changed mode definition is used. It only takes one error-free transmission and reception of the global packet to get the new mode definition to a subscriber terminal. Additionally no actual mode switching is permitted to occur except in response to the "noise-immune" framing code. This condition restrains the changes in mode definitions that may be made. This is best illustrated by the table in FIG. 6.

As illustrated, with FC1 and a mode definition of state 01, the mode definition state can only be changed to state 00. Since state 00 and state 01 both define the mode of filter A'/B' no mode change occurs. A framing code change to FC2 will then select the same descrambling mode A'/B'.

In state 00 with FC2, the table in FIG. 6 dictates a mode definition change to state 10, which does not result in a descrambling mode change. A change to framing code FC1 will now result in a descrambling mode change to filters A'/C'. It is thus seen that significant descrambling mode changes may be made by this technique which obtains the benefits of decryption and reliable switching signal transmission.

Since, the framing code is only one part of the information used for determining the descrambling mode, and may be changed on a dynamic basis, the task of a would-be pirate becomes much more difficult. Given the fact that the other part of the information is encrypted in the data channel, the system security is greatly enhanced. While the descrambling mode is identified by the combination of the framing code and the mode definition, the "meanings" of the framing code and the mode definitions are being continually changed. Thus, it will be extremely difficult, if not impossible, for a pirate to operate filters A', B' and C' in synchronism with the encoding filters without the ability to decrypt the data as well as the framing code signals. It is submitted that the task would be extremely difficult for a "professional" pirate and virtually impossible for all others.

It is recognized that numerous modifications and changes in the described embodiment of the invention will be apparent to those skilled in the art without departing from its true spirit and scope. The invention is to be limited only as defined in the claims.

What is claimed is:

1. In a television system having encoding filters A, B and C for selectively scrambling a television signal:
   a plurality of subscriber terminals each including means for receiving said scrambled television signal, three complementary decoding filters and means for operating said decoding filters for descrambling said scrambled television signal;
   means for selectively inserting first and second relatively noise immune framing code signals in the vertical blanking interval of said television signal;
   memory means for storing mode definition information;
   means for transmitting mode definition data for changing said mode definition information stored in said memory means; and
   means coupled to said operating means for selectively enabling operation of pairs of said descrambling filters in accordance with said stored mode definition information and said framing code signals and for changing among said pairs of descrambling filters only in response to a change in said framing code signals.

2. The system of claim 1 wherein said transmitted mode definition data is encrypted and wherein said subscriber terminals include means for decrypting said mode definition data and means for associating said descrambling filters with said framing code signals and said mode definition information.

3. The method of operating a television signal scrambling system comprising the steps of:
   scrambling a television signal in either a first or a second scrambling mode;
   storing a plurality of mode definitions at subscriber terminals;
   conveying relatively noise immune mode switching signals to subscriber terminals;
   operating the subscriber terminals for switching between corresponding descrambling modes in accordance with the stored mode definition and the conveyed mode switching signals, wherein said descrambling modes are redefined to preclude a change in descrambling modes except in response to mode switching signals; and
   conveying mode definition data for changing said stored mode definitions.

4. The method of claim 3, further comprising the step of providing the mode definition data in encrypted form; and decrypting the mode definition data in the subscriber terminal.

5. The method of claim 4 wherein the mode switching signals are transmitted in the vertical blanking interval of a television signal and selectively comprise a first or a second framing code and wherein the mode definition data is transmitted during the horizontal blanking intervals of said television signal and comprises binary data, the state of which is defined by the width of the horizontal blanking intervals.

6. In a television signal decoder:
memory means for storing a plurality of mode definitions that define a plurality of television signal descrambling modes;
means for receiving mode definition data for storage in said memory means for redefining said plurality of descrambling modes;
means responsive to receipt of a framing code signal for operating said decoder according to a selected one of the descrambling modes defined by said stored mode definitions; and
wherein said descrambling modes are redefined to preclude a change in descrambling modes except in response to a framing code signal.

7. A television decoder comprising:
means responsive to a first relatively noise immune framing code signal for selecting a first descrambling mode and to a second relatively noise immune framing code signal for selecting a second descrambling mode;
memory means for storing mode definitions defining said first and said second descrambling modes;
means responsive to a data signal for selectively changing the definitions of said descrambling modes in said memory means; and
wherein said descrambling modes are redefined to preclude a change in descrambling mode except in response to a framing code signal.

8. The decoder of claim 7 wherein said data signal is encrypted and said means for changing includes means for decrypting said data signal.

9. In a television system having:
encoding means for selectively scrambling a television signal in first and second scrambling modes;
means for transmitting a first relatively noise immune framing code signal and a second relatively noise immune framing code signal;
means for transmitting a data signal;
a plurality of subscriber terminals including:
means for receiving said scrambled television signal;
descrambling means;
means responsive to said framing code signals for operating said descrambling means to descramble television signals scrambled in said first and said second scrambling modes;
memory means for storing mode definitions defining said first and said second descrambling modes;
means responsive to said data signal for selectively changing the definitions of said descrambling modes stored in said memory means; and
wherein a change in said descrambling modes is not permitted except in response to a change in said framing code signals.

10. The television system of claim 9 wherein said data signal is encrypted and wherein said subscriber terminals include means for decrypting said encrypted data signal.

11. The television system of claim 10 wherein said scrambling modes are defined by first and second pairs of filters, an actual change in filter pairs only occuring in response to a change in said relatively noise immune framing code signals.

12. The television system of claim 11 wherein said framing code signals comprise pulse width modulated data start signals in the vertical blanking interval of said television signal.

13. A television decoder comprising:
means responsive to a first relatively noise immune framing code signal for selecting a first descrambling mode and to a second relatively noise immune framing code signal for selecting a second descrambling mode;
memory means for storing mode definitions defining said first and said second descrambling modes;
means responsive to an encrypted data signal for selectively changing the definitions of said descrambling modes in said memory means; and
wherein an actual change in descrambling modes is only permitted in response to a change in said framing code signals.

* * * * *